United States Patent Office 2,702,009
Patented Feb. 15, 1955

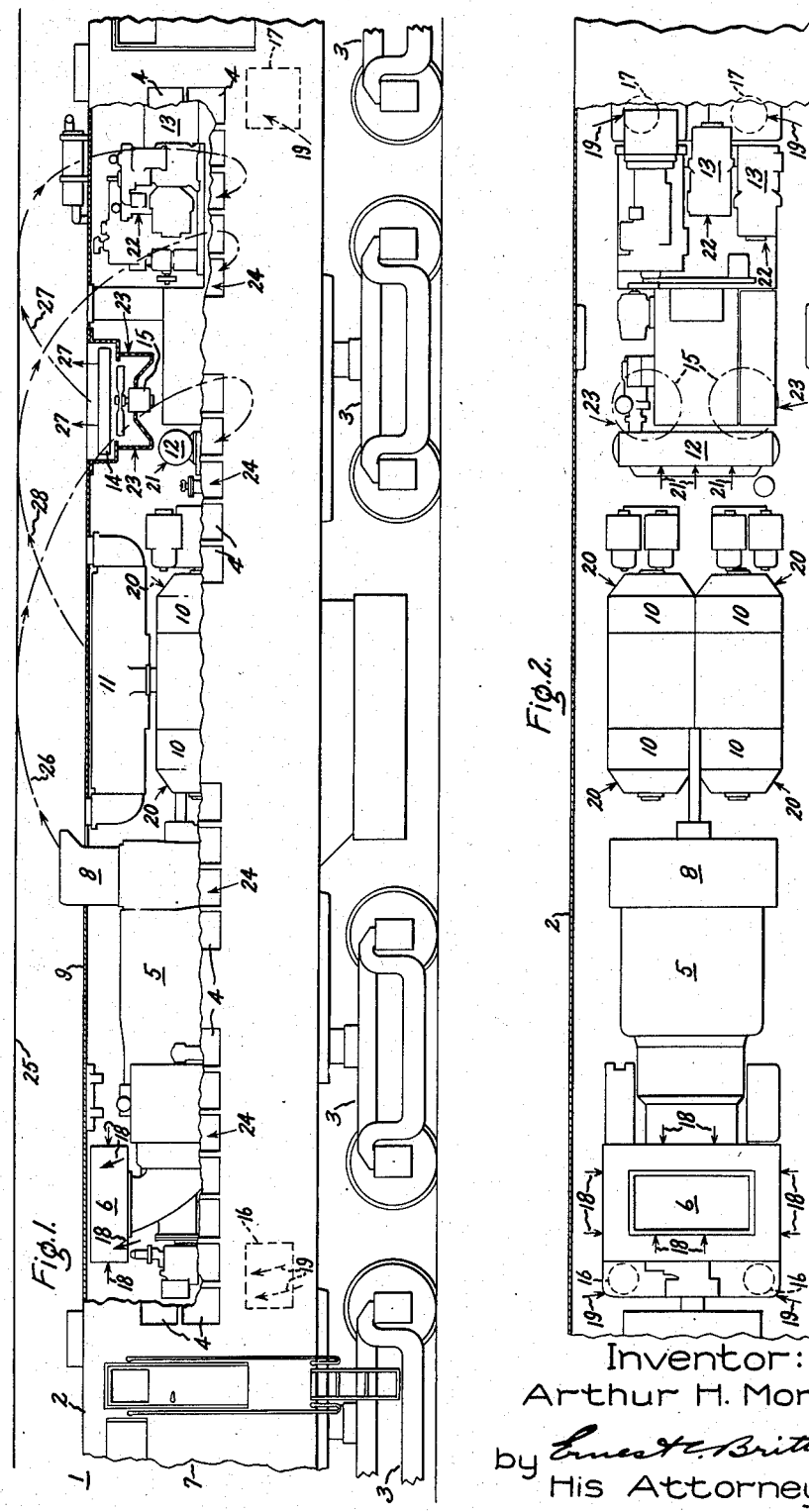

2,702,009

VENTILATION SYSTEM FOR SELF-PROPELLED VEHICLES

Arthur H. Morey, Erie, Pa., assignor to General Electric Company, a corporation of New York Application July 28, 1951, Serial No. 239,143

4 Claims. (Cl. 105—62)

This invention relates to a self-propelled rail vehicle, for example, a gas turbine-electric locomotive, and more particularly to the arrangement of the major components within such a vehicle.

In the design of self-propelled rail vehicles, such as gas turbine-electric locomotives, it is customary to provide means for admitting air to the interior of the equipment compartment of the body which is then drawn into the air intake of the gas turbine prime mover. The exhaust of the prime mover is usually carried through the roof of the body and deflected rearwardly, and during ordinary operation of the locomotive out of doors, no difficulty is experienced with recirculation of the hot exhaust gases back into the interior of the body and into the air intake of the prime mover. However, during tunnel operation, the exhaust gas discharged rearwardly from the prime mover exhaust forms a pair of helices when it strikes the curved tunnel roof. The pitch of this helix is a function of the locomotive speed so that at lower speeds, the hot exhaust gases may impinge upon the sides of the locomotive. These hot exhaust gases may, therefore, be drawn back into the interior of the body and in turn into the air intake of the prime mover with an accompanying decrease in efficiency. It is, therefore, desirable, in the design of such a locomotive, to arrange the major components so that these gases which may re-enter the body do so rearwardly of the air intake of the gas turbine and are there utilized by various air-utilizing apparatus, such as air compressors, radiator fans, and the generator, and re-exhausted again through the roof of the body before they have an opportunity to travel lengthwise inside the equipment compartment to enter the air inlet of the gas turbine.

It is, therefore, an object of this invention to provide an improved self-propelled rail vehicle having a thermal power plant prime mover in which the components are so arranged that the ventilation requirements of the apparatus in the rear of the vehicle forms a trap for the high temperature exhaust gases recirculating and entering the rear of the equipment compartment.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a self-propelled rail vehicle is provided, such as a locomotive, having a thermal power plant prime mover, for example, a gas turbine, arranged in the equipment compartment of the body toward the front thereof. The body of the vehicle is provided with means extending longitudinally along the sides for admitting air to the interior of the equipment compartment and the prime mover is provided with an air intake toward the front of the vehicle and an exhaust extending through the roof of the body rearwardly of the air intake for directing the exhaust gases rearwardly at an angle to the horizontal. In order to prevent recirculation of the hot exhaust gases through the air admitting means toward the rear of the equipment compartment and back into the air intake of the prime mover during tunnel operation, air utilizing means are arranged in the equipment compartment of the vehicle rearwardly of the exhaust including means for discharging the air so utilized back through the roof of the vehicle. These air utilizing means include the prime mover driven generator, air compressors, etc., serially arranged rearwardly of the prime mover and braking resistance grids and radiator fans arranged in the roof of the vehicle also rearwardly of the prime mover. Thus, in the event that the vehicle is operating in a tunnel at a speed sufficiently slow that the point of impingement of the helix formed by the exhaust gas is sufficiently forward so that the gas will enter the air admitting means, these gases coming into the rear of the vehicle will be used by the air compressors, radiator fans, and eventually, if the speed is sufficiently low, the main generator and then re-exhausted through the roof before they have had an opportunity to enter the prime mover air inlet. In this way, the ventilation requirements of the apparatus rearwardly of the prime mover form a trap for the high temperature exhaust gases by utilizing these gases so that they cannot recirculate to the forward part of the vehicle and enter the air inlet of the prime mover.

In the drawing, Fig. 1 is a fragmentary side elevational view, partly broken away, of a gas turbine-electric locomotive having its major components arranged in accordance with this invention; and Fig. 2 is a top view showing the arrangement of the components of Fig. 1.

Referring now to Fig. 1, there is shown a self-propelled rail vehicle 1, such as a gas turbine-electric locomotive, having a body 2 carried by suitable trucks 3. The sides of the body 2 are provided with a plurality of air admitting openings 4 extending longitudinally from front to rear for admitting ventilating air to interior of the equipment compartment portion of the body. Arranged in the forward part of the equipment compartment is a thermal power plant 5, such as a gas turbine having an air inlet 6 toward the front 7 of the locomotive and an exhaust deflector outlet 8 rearwardly of the air inlet 6 extending through the roof 9 of the locomotive for directing the exhaust gases rearwardly at an angle to the horizontal, as shown by the arrow 26. Such an exhaust deflector is more fully shown and described in co-pending application Serial No. 238,718 filed July 26, 1953, now issued as U. S. Patent 2,609,766, Bruce O. Buckland and Arthur H. Morey, assigned to the assignee of the present application. The prime mover 5 is arranged to drive a plurality of main generators 10 arranged rearwardly of the prime mover and suitable braking resistor grids 11 are arranged in the roof 9 over the generators 10. A heat exchanger 12 and air compressors 13 are arranged still further rearwardly of the prime mover 5 and a radiator 14 is arranged in the roof 9 with a pair of fans 15 for drawing air from the interior of the body and for blowing this air across the radiators 14 out of the body 2. Traction motor blowers 16 and 17 are located toward the front and rear of the locomotive as shown in Figs. 1 and 2.

The air demand of the turbine 5 is shown by the arrows 18 and the air demand of the traction motor blowers 16 and 17 by the arrows 19. Ventilating air enters the generators 10, as shown by the arrows 20, the heat exchanger 12 as shown by the arrows 21, and the air compressors 13 as shown by the arrows 22. Air is drawn from the interior of the equipment compartment of the body 2 by the fan 15 as shown by the arrows 23 and blown across the radiator 14 and out of the body as shown by the arrows 27. Air enters the interior of the body 2 through the air admitting openings 4 as shown by the arrows 24.

When the locomotive 1 is operating in a tunnel having a roof 25, as shown in Fig. 1, the exhaust gas from the exhaust outlet 8, being deflected rearwardly at an angle to the horizontal, forms a pair of helices when it strikes the tunnel roof, as shown by the arrows 26. The pitch of this helix is a function of the locomotive speed and as the locomotive slows down, the point of impingement of the hot exhaust gases with the sides of the body 2 moves forward so that the gases re-enter the air admitting openings 4 toward the rear of the locomotive. The hot gases from the exhaust 8, shown by the arrows 26, entering the rear of the locomotive through the air admitting openings 4, are used by the air compressors 13, the heat exchanger 12, traction motor blowers 17, and eventually, if the speed of the locomotive is low enough, by the main generators 10. The hot air in the rear portion of the equipment compartment is then drawn from the interior of the body by the fans 15 and forced across the radiators 14 out of the roof 9 as shown by the arrows 27. If the locomotive speed is sufficiently low, this discharged hot air may again enter the openings 4, as shown by the arrows 27. A portion of the air including that discharged by the generators 10 is passed through the braking resistor grids 11 and discharged from the top of the locomotive as shown by the arrows 28. Here again, if the speed of the locomotive is sufficiently slow, this air may again enter the interior of the body through the openings 4, as shown by the arrows 28.

It will now be readily apparent that the hot exhaust gases entering the rear of the locomotive body through the openings 4 are utilized by the various components arranged rearwardly of the prime mover 5, including the air compressors 13, traction motor blowers 17, heat exchanger 12, and generators 10, and are discharged from the body by the radiator fans 15 and the braking resistor grids 11. Thus, these hot gases do not have an opportunity to travel lengthwise toward the front 7 of the body to enter the air inlet 6 of the prime mover 5. Therefore, the ventilation requirements of the various components in the rear of the equipment compartment form a trap for the high temperature exhaust gases recirculating and entering the rear of the body preventing these gases from traveling forward to again enter the air inlet of the prime mover with a resultant decrease in efficiency. In a locomotive actually constructed utilizing this arrangement of components, with the locomotive standing still in the center of a mile-long tunnel with essentially zero wind velocity outside the tunnel, hot exhaust gases entered the rear of the locomotive body, but instruments measured no rise in the temperature of the air entering the power plant inlet.

It will now be readily apparent that this invention provides an improved arrangement of components in a self-propelled rail vehicle having a thermal power plant prime mover wherein recirculation of hot exhaust gases into the air inlet of the prime mover is prevented.

While I have shown and described a particular embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim as new and desire to secure by Letters Patent of the United States is:

1. In a self-propelled rail vehicle having a body with longitudinally extending openings formed along the sides for admitting air to the interior thereof, a thermal power plant prime mover in said body arranged toward the front thereof, an air intake for said prime mover arranged toward the front thereof in said body, an exhaust outlet for said prime mover extending through the roof of said body rearwardly of said prime mover, apparatus having means for drawing ventilating air therein and discharging the same therefrom positioned in said body rearwardly of said prime mover, and means for discharging said ventilating air from the interior of said body through the roof thereof positioned rearwardly of said prime mover exhaust so that exhaust gases from said prime mover which enter said body through said air admitting means are used by said apparatus and exhausted from said body by said air discharging means whereby the ventilation requirements of said apparatus rearwardly of said prime mover form a trap for said prime mover exhaust gas so that said exhaust gas does not re-enter said prime mover air inlet.

2. In a self-propelled rail vehicle having a body with longitudinally extending openings formed along the sides for admitting air to the interior thereof, a thermal power plant prime mover in said body arranged toward the front thereof, an air intake for said prime mover arranged toward the front thereof in said body or an exhaust outlet for said prime mover extending through the roof of said body rearwardly of said air intake, a plurality of pieces of apparatus in said body respectively having means for drawing ventilating air therein and discharging the same therefrom serially positioned rearwardly of said prime mover air intake, and means for discharging said ventilating air from the interior of said body through the roof thereof positioned rearwardly of said prime mover exhaust so that exhaust gases from said prime mover which enter said body through said air admitting means are used by said pieces of apparatus and exhausted from said body by said air discharging means whereby the ventilation requirements of said pieces of apparatus rearwardly of said prime mover form a trap for said prime mover exhaust gas so that said exhaust gas does not re-enter said prime mover air inlet.

3. In a self-propelled rail vehicle having a body with longitudinally extending openings formed along the sides for admitting air to the interior thereof, a thermal power plant prime mover in said body, an air intake for said prime mover arranged toward the front thereof in said body, an exhaust outlet for said prime mover extending out of said body rearwardly of said air intake; air utilizing means in said body including a generator driven by said prime mover and having means for drawing ventilating air therein, and discharging the same therefrom said generator being positioned rearwardly of said prime mover, and an air compressor in said body rearwardly of said generator having means for drawing ventilating air therein and discharging the same therefrom; and means for discharging said ventilating air from the interior of said body rearwardly of said prime mover exhaust including a radiator in the roof of said body rearwardly of said prime mover exhaust and having a fan for forcing said ventilating air from the interior of said body thereover for discharge from said body so that exhaust gases from said prime mover which enter said body through said air admitting means are used by said air utilizing means and exhausted from said body by said air discharging means whereby the ventilation requirements of said air utilizing means rearwardly of said prime mover form a trap for said prime mover exhaust gas so that said exhaust gas does not re-enter said prime mover air inlet.

4. In a self-propelled rail vehicle having a body with longitudinally extending openings formed along the sides for admitting air to the interior thereof, a gas turbine power plant prime mover in said body arranged toward the front thereof, an air intake for said prime mover arranged toward the front thereof in said body, an exhaust outlet for said prime mover extending through the roof of said body rearwardly of said air intake; air utilizing means in said body including a generator driven by said prime mover and having means for drawing ventilating air therein and discharging the same therefrom said generator being positioned rearwardly of said air intake, and an air compressor in said body positioned rearwardly of said generator having means for drawing ventilating air therein and discharging the same therefrom; first means for discharging said ventilating air from the interior of said body through the roof thereof including braking resistor grids in said roof rearwardly of said prime mover exhaust, and second means for discharging ventilating air from the interior of said body through said roof including a radiator in the roof of said body rearwardly of said first discharging means and having a fan for forcing said ventilating air from the interior of said body thereover for discharge from said body so that exhaust gases from said prime mover which enter said body through said air admitting means are used by said air utilizing means and exhausted from said body by said air discharging means whereby the ventilation requirements of said air utilizing means rearwardly of said prime mover form a trap for said prime mover exhaust gas so that said exhaust gas does not re-enter said prime mover air inlet.

UNITED STATES PATENTS

References Cited in the file of this patent

| | | |
|---|---|---|
| 1,475,735 | Austin | Nov. 27, 1923 |
| 1,570,106 | Wagner | Jan. 19, 1926 |
| 2,195,599 | Ragsdale et al. | Apr. 2, 1940 |

OTHER REFERENCES

Locomotive Cyclopedia, 13th ed., 1947 (page 972).